No. 662,567. Patented Nov. 27, 1900.
I. VON LIPOWSKA & G. VON GELDERN-EGMOND ZU ARCEN.
METAL BEARING PLATE.
(Application filed Apr. 25, 1900.)
(No Model.) 4 Sheets—Sheet 1.
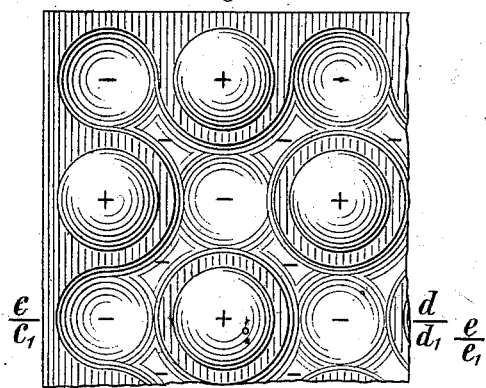
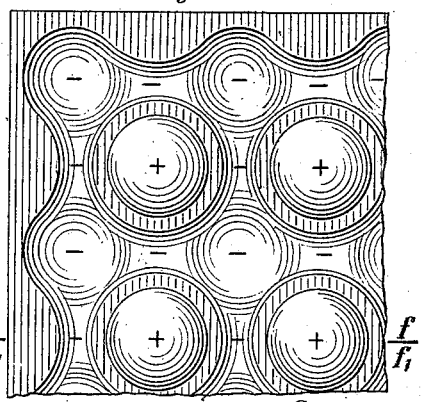
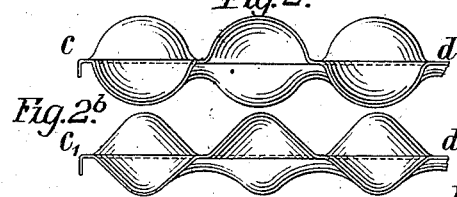
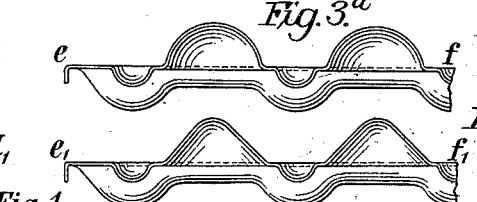
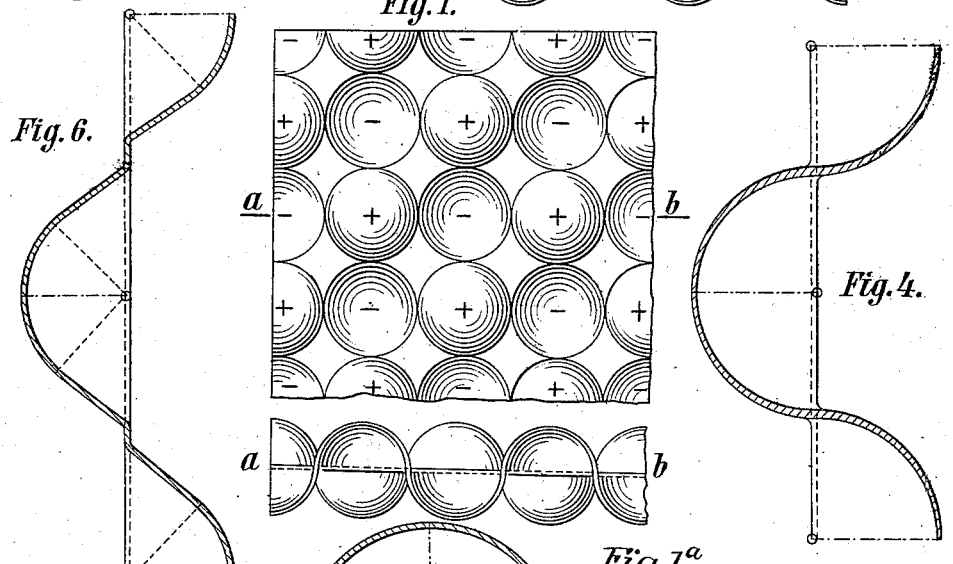

No. 662,567. Patented Nov. 27, 1900.
I. VON LIPOWSKA & G. VON GELDERN-EGMOND ZU ARCEN.
METAL BEARING PLATE.
(Application filed Apr. 25, 1900.)
(No Model.) 4 Sheets—Sheet 2.
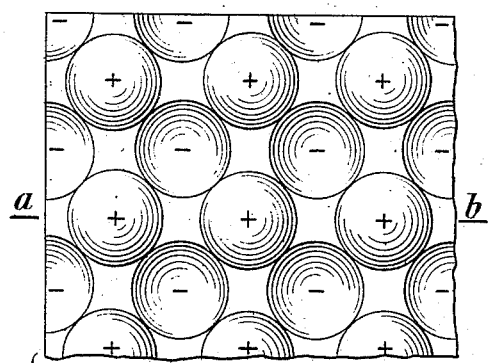
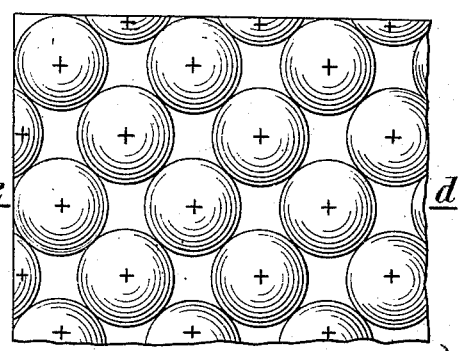
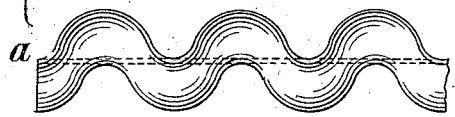
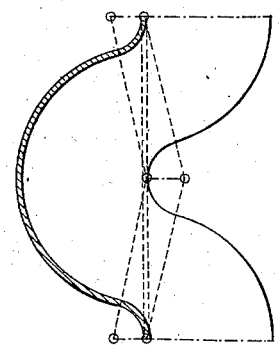
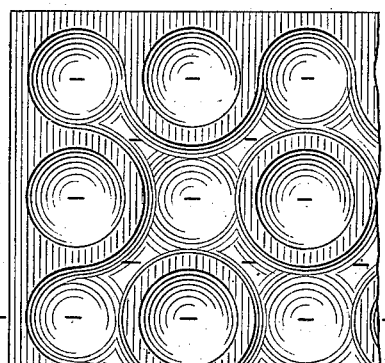

No. 662,567. Patented Nov. 27, 1900.
I. VON LIPOWSKA & G. VON GELDERN-EGMOND ZU ARÇEN.
METAL BEARING PLATE.
(Application filed Apr. 25, 1900.)

(No Model.) 4 Sheets—Sheet 3.

Witnesses
Inventors

No. 662,567. Patented Nov. 27, 1900.
I. VON LIPOWSKA & G. VON GELDERN-EGMOND ZU ARÇEN.
METAL BEARING PLATE.
(Application filed Apr. 25, 1900.)
(No Model.) 4 Sheets—Sheet 4.

UNITED STATES PATENT OFFICE.

ISABELLA VON LIPOWSKA, OF KRAKAU, AND GUSTAV VON GELDERN-EGMOND ZU ARÇEN, OF VIENNA, AUSTRIA-HUNGARY.

METAL BEARING-PLATE.

SPECIFICATION forming part of Letters Patent No. 662,567, dated November 27, 1900.

Application filed April 25, 1900. Serial No. 14,344. (No model.)

*To all whom it may concern:*

Be it known that we, ISABELLA VON LIPOWSKA, (née VON GELDERN-EGMOND ZU ARÇEN,) residing at Karmelitergasse 42, Krakau, and GUSTAV VON GELDERN-EGMOND ZU ARÇEN, residing at Hansenstrasse 3, Vienna I, Austria-Hungary, have invented a certain new and useful Improvement in the Manufacture of Sheet-Metal Bearing-Plates, of which the following is a specification.

The plates that have hitherto been generally used as bearing-plates for building purposes are those of the corrugated form, the carrying power of which depends upon the depth and configuration of the corrugations, which run in one direction only of the plate. It may be stated generally as to those that the greater the depth of the corrugations and the narrower these are the greater will be the equally-distributed load which they can bear for one and the same span and unit of surface.

It is more than probable that sheet metal to which such a form is imparted that sections taken in various directions will show undulating lines would behave in an analogous manner to ordinary corrugated sheet metal if the undulations had a relative stiffening effect—that is to say, if the ridges and the valleys thereof were arranged symmetrically relatively to a horizontal base and were securely united to the latter.

The present invention relates to the manufacture of bulged plates having the above-described features, for which purpose flat plates heated to redness are so molded under press-dies or between pressing-rollers that by pressing either upward and downward or only upward approximately hemispherical cup-shaped bulges are formed which project upward and downward and which can be so arranged as to lie in squares like a chess-board or in rows.

Figure 13:
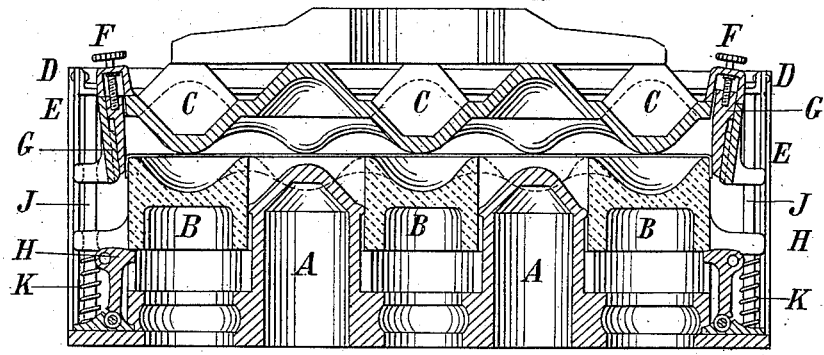
Figure 14:
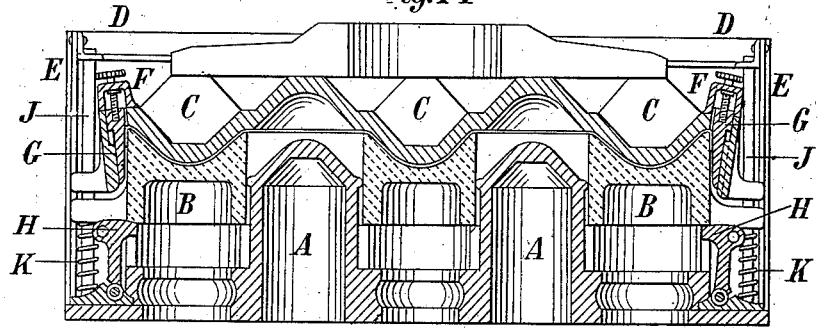
Figure 15:
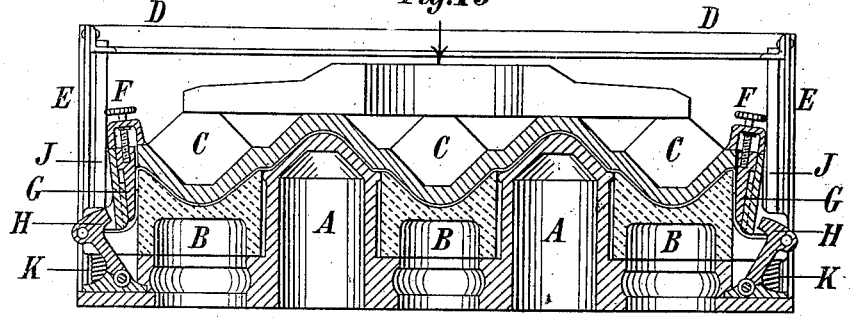
Figure 16:
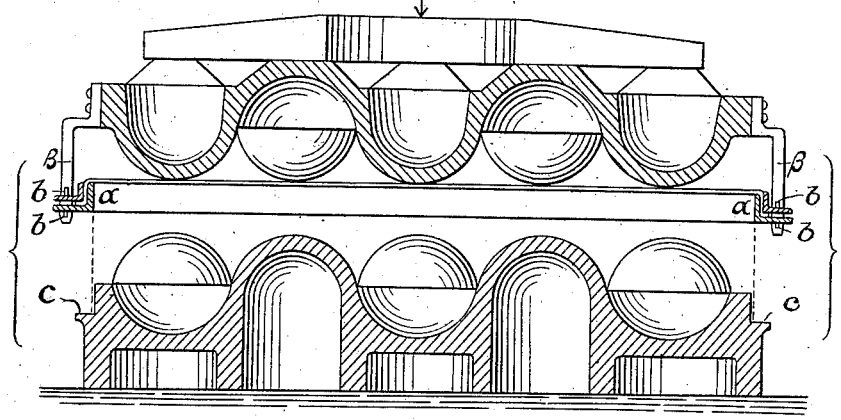
Figure 17:
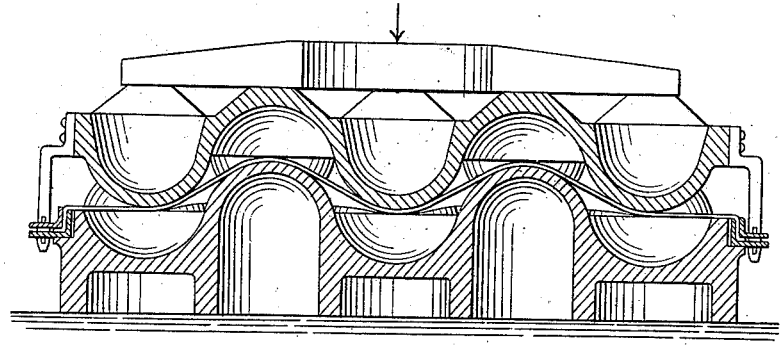
Figure 18:
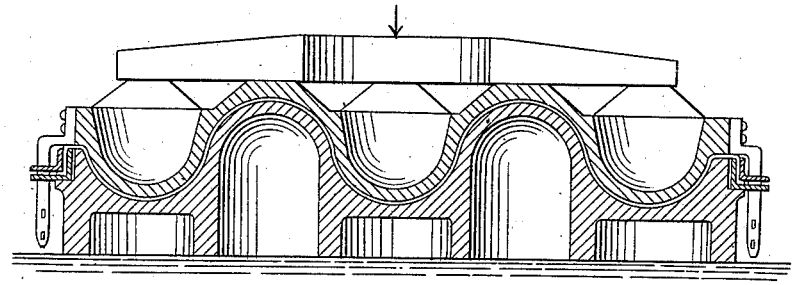

In the accompanying drawings, Figure 1 is a plan of a plate, showing one form in which our invention may be embodied. Fig. 1ª is a section on the line $a\,b$ of Fig. 1. Figs. 2 and 3 are plans showing other forms in which our invention may be embodied. Figs. 2ª and 3ª are sections of Figs. 2 and 3 on the lines $c\,d$ and $e\,f$, respectively. Figs. 2ᵇ and 3ᵇ are sections similar to Figs. 2ª and 3ª, but showing bulges of a different shape. Fig. 4 is an enlarged detail of Fig. 1ª; Fig. 5, an enlarged detail of Fig. 2ª; Fig. 6, an enlarged detail of Fig. 2ᵇ. Fig. 7 is a plan view showing still another form in which our invention may be embodied. Fig. 7ª is a section on the line $a\,b$ of Fig. 7. Fig. 8 is a plan view showing a plate with all the bulges projecting upwardly. Fig. 8ª is a section on the line $c\,d$ of Fig. 8. Fig. 9 is a plan view showing a plate with all the bulges projecting downwardly and of a different form from those in Fig. 8. Fig. 9ª is a section on the line $e\,f$ of Fig. 9. Figs. 10, 11, and 12 are respectively enlarged details of Figs. 7ª, 8ª, and 9ª. Figs. 13, 14, and 15 are sectional views of a die-press in different positions adapted to form bulges projecting from each side of the plate. Figs. 16, 17, and 18 are similar views of a two-part die-press to form bulges projecting from both sides of the plate.

In the plans the upwardly-projecting bulges are marked + and the downwardly-projecting bulges are marked —. The shape of the bulges may vary, and in the examples illustrated they are approximately hemispherical—that is, the rounded head is standing on a round conical basis. The parts shaded vertically in Figs. 2, 3, and 9 indicate the parts of the plate in the basis of symmetry which support and inclose the bulges.

A further modification could be produced if while maintaining the chess-board-like arrangement of Fig. 1 the form of the cup-shaped bulges themselves were altered. Thus if in place of taking a circle as the basis of the bulges the circumscribed square were taken the bulges might assume the form of a Gothic or pointed vault. With this modification if the original plate were made correspondingly thicker the bulges might be made of greater depth than with the hemispherical form.

In forming the cup-shaped bulges in the plate we do not intend to decrease the length or width of the flat plate, but to stretch the metal to form the bulges, and in order to do this it is absolutely necessary that the plate be clamped tightly around its edges while the bulges are being formed. Obviously the bulged portions will be thinner than the adjacent base portions of the plate surrounding each bulge, which are not stretched. In Figs. 13 to 18 we have illustrated die-presses adapted to press out the bulges in the manner proposed.

The die in Figs. 13, 14, and 15 is composed of a lower part A A as a basis, the middle part B B, and the upper part C C, and the clamping device for the plate. The upper part and the middle part are only movable in vertical direction along their guiding-rods J J, the upper ends of the latter being supported in the frame D D, supported on the posts E E. The clamping device is so arranged that on all four sides of the upper part C C of the die-frame pieces G G, formed of several parts on the long sides, having a wedge-shaped cross-section and sliding in guides, can be moved upwardly and downwardly by means of screws F F. The hooks H H are for the purpose of firmly supporting the middle part while the pressing of the negative lobes is effected. The hooks must be turned down for the final pressing. After the lifting up of the upper part the middle part should ascend automatically, and springs K K are used for this purpose.

The construction of a die formed of two parts only is shown in Figs. 16, 17, and 18. The sheet metal is firmly clamped in a double frame of angle-iron $x\ x$. The frame is then placed upon the upper die, the latter having been lifted to the position shown in Fig. 16 and secured by means of the wedges $b\ b$ on the bolts B B, thus being firmly united with the upper part of the die. The upper part of the die and the clamping-frame descend together until the frame settles upon shoulders $c$ on the lower die and the metal plate assumes the shape shown in cross-section in Fig. 17. The wedges $b$ are then removed, and the bending and pressing can be continued by the further downward movement of the upper die, so that finally the metal takes the shape shown in Fig. 18.

A die operating as above described is simpler and of more general use than the one of the first example; but since more manual labor is necessary the pressing may require more time.

The manufacture of the said bulged plates if carried on within similar limits to those observed with ordinary corrugated plates would not present any difficulties, and the following conditions may be observed with the same:

First. The length of the bulged plates can be made equal to that of ordinary corrugated plates.

Second. The width of the plates can, however, be greater than ordinary corrugated plates.

Third. The thickness of the plates before working should be much greater than that of ordinary corrugated plates, and it should increase in proportion to the increase in the depth of the bulges.

Fourth. As only plates whose material is of good quality can undergo the extension necessary for forming the bulges without tearing and as the strain of such bulging will be the more readily overcome the greater the base of the bulge is, it is advisable to make the width of the bulges about double that usually adopted for the corrugation of ordinary corrugated plates.

Fifth. The pressing of the plates can either be effected so as to produce the bulges simultaneously on both sides or the two sides may be pressed separately, the downward pressure being preferably effected first. In pressing it is advisable to fix the plate firmly in position at the edges. After pressing the plates should be trimmed.

Sixth. An accurate calculation of the bearing powers of the forms of the bulged plates shown on the drawings is not possible on account of the great diversity of lines of strain occuring in them, so that any such calculations must be based on empirical data derived from experiments. It may, however, be stated as the result of experiments that on comparing bulged plates of the types shown at Figs. 1, $1^a$, 7, and $7^a$ of the drawings with corrugated plates having the same depths of corrugations a greater supporting power is afforded by the former than by the latter (the sum of the bearing-surfaces being about equal in both cases for the same superficial area of plate, while the thickness of the bulged plates is always greater) and that if a soft metal be employed this will be improved by the compression to which it is subjected in pressing out the bulges.

The application of the above-described bulged plates in lieu of corrugated plates will be of advantage in various ways. Thus, for example, it has been proved: (a) On comparing the types of bulged plate shown at Figs. $1^a$ and $7^a$, which were produced from plates that were originally six millimeters thick and weighed 46.8 kilos per square meter, with a corresponding type of corrugated plates of one hundred and twenty millimeters height and width of corrugation and three millimeters thickness and weighing without laps 61.9 kilos per square meter a saving of weight of 24.2 per cent. in favor of the bulged plates was shown, amounting to about the same percentage of saving in cost. (b) When using such bulged plates for the ceilings of buildings, there was shown, first, a saving in the height of structure in comparison with other constructions of ceilings, and consequently a reduction in height of the several stories; second, a considerable reduction in the weight of the structure; third, complete security against burglarious entry; fourth, the bulged plates have an effective supporting-surface, allow of a strong connection of the plates with the supporting main walls, and in the event of their being built in during the erection the staging within the building is simplified; fifth, from what has been said under one to four it follows that in addition to the reduction in first cost of the bulged plates as compared with corrugated plates a further saving of cost is effected in the application of such plates to buildings, and, sixth, similar results are obtained in applying such plates to the construction of bridges and similar structures.

Having thus described the nature of this invention and the best means we know of carrying the same into practical effect, we claim—

The improved metal bearing-plate herein described, having cup-shaped bulges formed thereon by stretching the metal outwardly from the basis of symmetry of the plate at predetermined points, the metal forming the bulges being thinner than the adjacent unstretched portions surrounding each cup-shaped bulge, and the plate retaining its original dimensions after the bulges are formed, substantially as described.

In testimony whereof we have signed our names to this specification in the presence of two subscribing witnesses.

ISABELLA VON LIPOWSKA.
GUSTAV VON GELDERN-EGMOND ZU ARCEN.

Witnesses:
C. B. HURST,
ALVESTO S. HOGUE.